(12) United States Patent
Funada et al.

(10) Patent No.: US 9,450,800 B2
(45) Date of Patent: Sep. 20, 2016

(54) WIRELESS TRANSMITTER, WIRELESS RECEIVER, WIRELESS TRANSMISSION METHOD, AND WIRELESS RECEPTION METHOD

(71) Applicant: NATIONAL INSTITUTE OF INFORMATION AND COMMUNICATIONS TECHNOLOGY, Koganei-shi, Tokyo (JP)

(72) Inventors: Ryuhei Funada, Koganei (JP); Keiichi Mizutani, Koganei (JP); Hiroshi Harada, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 0 days.

(21) Appl. No.: 14/758,494

(22) PCT Filed: Oct. 31, 2013

(86) PCT No.: PCT/JP2013/006452
§ 371 (c)(1),
(2) Date: Jun. 29, 2015

(87) PCT Pub. No.: WO2014/108947
PCT Pub. Date: Jul. 17, 2014

(65) Prior Publication Data
US 2015/0341201 A1 Nov. 26, 2015

(30) Foreign Application Priority Data
Jan. 10, 2013 (JP) ................................. 2013-002774

(51) Int. Cl.
*H04K 1/10* (2006.01)
*H04L 27/26* (2006.01)
(Continued)

(52) U.S. Cl.
CPC ..... *H04L 27/2646* (2013.01); *H04L 25/03828* (2013.01); *H04L 25/03834* (2013.01);
(Continued)

(58) Field of Classification Search
CPC ............. H04L 27/2647; H04L 5/0007; H04L 27/2657; H04L 27/2662; H04L 5/0048; H04L 3/54; H04L 25/4902; H04L 1/0009; H04L 1/0041; H04L 25/49
USPC .......................... 375/260, 259, 295, 316, 219
See application file for complete search history.

(56) References Cited

U.S. PATENT DOCUMENTS

2008/0002645 A1  1/2008  Seki et al.
2009/0088083 A1  4/2009  Fujii et al.
(Continued)

FOREIGN PATENT DOCUMENTS

EP    1873989 A1    1/2008
EP    2043402 A2    4/2009
(Continued)

OTHER PUBLICATIONS

"Part 11: Wireless LAN Medium Access Control (MAC) and Physical Layer (PHY) Specifications", IEEE Std 802.11-2012, IEEE Computer Society, Mar. 29, 2012.
(Continued)

*Primary Examiner* — Zewdu Kassa
(74) *Attorney, Agent, or Firm* — Holtz, Holtz & Volek PC (57) ABSTRACT

In order to suppress out-of-band radiation within a range of a spectrum mask regulation without reducing transmission signal power or the like even when a wireless communication is performed in a white space by using OFDM or the like, the present invention is characterized by including an RF circuit characteristic analysis unit, a multipath delay detection unit, a digital filter setting unit, and a transmission power setting unit and further including: a windowing function/windowing duration selection unit configured to select a windowing function and a windowing duration based on the analysis result by the RF circuit characteristic analysis unit, the detection result by the multipath delay detection unit, and the setting by the digital filter setting unit and the transmission power setting unit; a guard interval duration selection unit configured to select a guard interval duration; and a transmission power selection unit configured to select transmission power.

12 Claims, 7 Drawing Sheets

(51) Int. Cl.
*H04L 25/03* (2006.01)
*H04W 16/14* (2009.01)

(52) U.S. Cl.
CPC ....... *H04L27/2602* (2013.01); *H04L 27/2605* (2013.01); *H04L 27/2634* (2013.01); *H04W 16/14* (2013.01); *Y02B 60/50* (2013.01)

(56) References Cited

U.S. PATENT DOCUMENTS

| | | | |
|---|---|---|---|
| 2010/0111207 A1 | 5/2010 | Suda et al. | |
| 2012/0224534 A1* | 9/2012 | Kimura | H04W 28/06 370/328 |
| 2012/0230449 A1* | 9/2012 | Futatsugi | H04J 11/003 375/296 |

FOREIGN PATENT DOCUMENTS

| | | |
|---|---|---|
| EP | 2068474 A1 | 6/2009 |
| JP | 2009225111 A | 10/2009 |

OTHER PUBLICATIONS

IEEE802.15-12-0377-00-004m, Jul. 17, 2012.

International Search Report (ISR) dated Dec. 17, 2013 issued in International Application No. PCT/JP2013/006452.

Keiichi Mizutani, et al., "Windowing pulse shaping for IEEE 802.15.4m NB-OFDM", IEEE 802.15-13-0031-03-004m, IEEE P802.15 Working Group for Wireless Personal Area Networks (WPANs), Jan. 15, 2013.

* cited by examiner

WIRELESS TRANSMITTER, WIRELESS RECEIVER, WIRELESS TRANSMISSION METHOD, AND WIRELESS RECEPTION METHOD

TECHNICAL FIELD

The present invention relates to a wireless communication apparatus and a wireless communication method using OFDM or the like, and more particularly, to a wireless transmitter, a wireless receiver, a wireless transmission method, and a wireless reception method, capable of effectively suppressing out-of-band radiation, without reducing transmission signal power or the like, even when a wireless communication is performed in an operating frequency band in which a transmission spectrum regulation is strict, such as white space.

BACKGROUND ART

In a wireless communication, a frequency is a very limited resource. For example, in Japan, TV broadcasts are carried out in 470 to 770-MHz bands, but time zones where no communication is performed may exist in the other frequency bands or even in the above bands.

Such frequency bands that are in a temporary or continuous non-use state are referred to as a white space. Research and development, and standardization have been conducted on wireless communication systems, such as IEEE 802.11af, IEEE 802.15.4m, and IEEE 802.22, so as to allow secondary users to utilize the white space.

In a case where the wireless communication is performed using the white space, it is necessary to comply with the spectrum mask regulation of each country, such as the transmission spectrum mask regulation of the Federal Communications Commission (FCC), so as to prevent disturbance in usage by a primary user. The transmission spectrum regulation of the wireless communication in the white space is stricter than the transmission spectrum mask such as a 2.4-GHz-band wireless LAN. Among them, the FCC is particularly strict.

Meanwhile, in the 2.4-GHz-band wireless LAN, a wireless communication using an Orthogonal Frequency Division Multiplexing (OFDM) scheme is used (refer to Patent Literature 1).

The OFDM scheme is a communication scheme that has various advantages, such as strong resistance to multipath transmission channels or high frequency utilization efficiency. In the OFDM scheme, data are mapped to a plurality of subcarriers aligned to be orthogonal to one another, a time-series signal is derived by performing an inverse Fourier transform on the data group, and a transmission symbol for wireless transmission is generated. Then, on the receiving side, the transmitted data group is derived by performing Fourier transform on the symbol, and the transmission data is reproduced by restoring individual data associated with each subcarrier.

Also, in addition to the OFDM, Orthogonal Frequency Division Multiple Access (OFDMA) also has been put to practical use. The OFDMA is a multiple access scheme in which a plurality of terminals transmits signals through different subcarriers.

In a wireless communication apparatus using the OFDM or the OFDMA, various methods of suppressing out-of-band radiation are used in order to satisfy the transmission spectrum mask of each country and each system.

Examples of the method of suppressing the out-of-band radiation may include a method of performing waveform shaping by using a windowing (refer to Non Patent Literature 1), a method of applying a convolution filter to a transmission signal on a baseband (refer to Non Patent Literature 2), and a method of reducing signal transmission power so as to comply with a transmission spectrum mask regulation.

In any case, it can be said that the transmission spectrum mask is defined by a signal obtained after a radio frequency conversion of a baseband signal, that is, a baseband signal waveform, and transmission spectrum characteristics of a function or an apparatus that performs radio frequency conversion.

CITATION LIST

Patent Literature

Patent Literature 1: JP 2009-225111 A

Non Patent Literature

Non Patent Literature 1: "IEEE Std 802.11TM-2012," IEEE Computer Society, 29 Mar. 2012
Non Patent Literature 2: IEEE 802.15-12-0377-00-004m, 17 Jul. 2012

SUMMARY OF INVENTION

Technical Problem

Meanwhile, in a case where the above-described various methods for suppressing the out-of-band radiation are applied to the wireless communication performed by using the OFDM in the operating frequency band in which the transmission spectrum regulation is strict, such as the white space, various problems occurs due to the strict transmission spectrum mask regulation.

For example, in the waveform shaping method using the above-described windowing, the windowing duration (for example, roll-off coefficient in the case of a cosine roll-off window) used in the windowing is generally uniquely determined for each wireless communication standard. Therefore, in a case where the strict transmission spectrum mask regulation such as FCC is satisfied by only this method, a high-performance, high-cost radio frequency conversion function and apparatus is required.

In addition, the method of applying a convolution filter to a transmission signal on a baseband can be combined with the method employing the windowing using a fixed value. However, in order to satisfy the strict transmission spectrum regulation such as FCC, the use of a large-scale circuit is needed, causing an increase in the size and cost of the device.

In addition, in the method of reducing the transmission signal power, if the transmission signal power is reduced to the extent to satisfy the transmission spectrum mask regulation, the coverage area of the communication is also narrowed. As a result, various services cannot be provided.

Therefore, the present invention has been made in consideration of the above-described problems, and an object of the present invention is to provide a wireless transmitter, a wireless receiver, a wireless transmission method, and a wireless reception method, which are capable of effectively suppressing out-of-band radiation, without reducing transmission signal power or the like, even when a wireless communication is performed in a white space by using OFDM or the like.

Solution to Problem

In order to solve the above-described problems, the inventors of the present application have invented a wireless transmitter and a wireless transmission method, which are capable of effectively suppressing out-of-band radiation within a range of a spectrum mask regulation, without reducing transmission signal power or the like, even when a wireless communication is performed by using OFDM or OFDMA in an operating frequency band in which the transmission spectrum regulation such as a white space is strict.

A wireless transmitter according to the present invention is a wireless transmitter for performing data transmission by using OFDM in an operating frequency band in which a transmission spectrum mask regulation is strict, the wireless transmitter including: an RF circuit characteristic analysis unit configured to analyze spectrum characteristics in a use frequency band, which are included in RF characteristics of a radio frequency (RF) conversion unit of the wireless transmitter; a multipath delay detection unit configured to detect the degree of multipath delay in a communication environment of the wireless transmitter; a transmission power setting unit configured to set desired transmission power of the wireless transmitter; and a digital filter setting unit configured to set parameters of a digital transmission filter of the wireless transmitter; and the wireless transmitter further including: a windowing function/windowing duration selection unit configured to select a windowing function and a windowing duration used in windowing to be executed in OFDM symbols based on the analysis result by the RF circuit characteristic analysis unit, the detection result by the multipath delay detection unit, and the setting by the transmission setting unit and the digital filter setting unit; a guard interval duration selection unit configured to select a guard interval duration to be added to the OFDM symbols; and a transmission power selection unit configured to select transmission power of the OFDM symbols.

The wireless transmitter according to the present invention can set the windowing function, the windowing duration, the guard interval duration, and the transmission power separately with respect to each of the OFDM symbols included in a preamble section of transmission data and a data section subsequent to the preamble section.

The wireless transmitter according to the present invention further includes a notification unit configured to notify the information of the windowing function, the windowing duration and the guard interval duration, or an optimal symbol synchronization timing of the OFDM symbol included in the preamble section and the data section of the transmission data, as a fixed windowing function, a fixed windowing duration, and a fixed guard interval duration. The information on the windowing function, the windowing duration, and the guard interval duration, or optimal symbol synchronization timing may be notified together with other control information.

The wireless receiver according to the present invention sets a symbol synchronization timing by using control information and the information on the windowing function, the windowing duration, and the guard interval duration, or the optimal symbol synchronization timing, which are included in the information notified from the above-described wireless transmitter.

A wireless transmission method according to the present invention is a wireless transmission method for performing data transmission by using OFDM in an operating frequency band in which a transmission spectrum mask regulation is strict, the wireless transmission method including: an RF circuit characteristic analysis step of analyzing spectrum characteristics in a use frequency band, which are included in RF characteristics of a radio frequency conversion unit of the wireless transmitter; a multipath delay detection step of detecting the degree of multipath delay in a communication environment of the wireless transmitter; a transmission power setting step of setting desired transmission power of the wireless transmitter; and a digital filter setting step of setting parameters of a digital transmission filter of the wireless transmitter; the wireless transmission method further including: a windowing function/windowing duration selection step of selecting a windowing function and a windowing duration used in windowing to be executed in OFDM symbols based on the analysis result in the RF circuit characteristic analysis step, the detection result in the multipath delay detection step, the setting in the digital filter setting step, and the setting in the transmission power setting step; a guard interval duration selection step of selecting a guard interval duration to be added to the OFDM symbols; and a transmission power selection step of selecting transmission power of the OFDM symbols.

In addition, in the wireless transmission method according to the present invention, the windowing function, the windowing duration, the guard interval duration, and the transmission power can be separately settable with respect to each of the OFDM symbols included in a preamble section of transmission data and a data section subsequent to the preamble section.

In addition, the wireless transmission method according to the present invention is characterized by further including a notification unit configured to notify the information on the windowing function, the windowing duration and the guard interval duration, or an optimal symbol synchronization timing of the OFDM symbol included in the preamble section and the data section of the transmission data, as a fixed windowing function, a fixed windowing duration, and a fixed guard interval duration. The information on the windowing function, the windowing duration, and the guard interval duration, or the optimal symbol synchronization timing may be notified together with other control information.

The wireless reception method according to the present invention sets a symbol synchronization timing by the information of the windowing function, the windowing duration, and the guard interval duration, or the optimal symbol synchronization timing, which are included in the information notified by using the wireless transmission method, and if necessary, the control information.

Advantageous Effects of Invention

According to the wireless transmitter, the wireless receiver, the wireless transmission method, and the wireless reception method, which are configured as described above, it is possible to suppress out-of-band radiation within the range of a spectrum mask regulation, without reducing transmission signal power or the like, even when a wireless communication is performed by using OFDM or the like in an operating frequency band in which the transmission spectrum regulation is strict, such as a white space.

DESCRIPTION OF EMBODIMENTS

Figure 1:
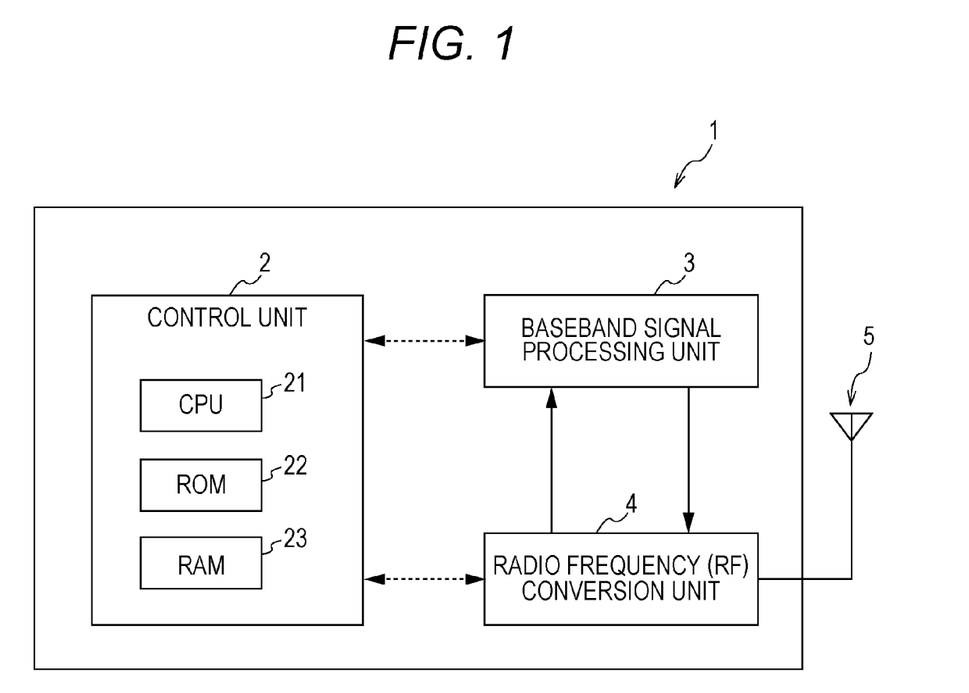
FIG. 1 is a configuration block diagram illustrating a hardware configuration of a wireless transmitter according to an embodiment of the present invention.

Hereinafter, a wireless transceiver according to an embodiment of the present invention will be described in detail. FIG. 1 is a configuration block diagram illustrating a hardware configuration of a wireless transceiver 1 according to an embodiment of the present invention.

The wireless transceiver 1 according to the present embodiment is configured to mainly include a control unit 2 which controls the overall wireless transceiver 1, a baseband signal processing unit 3, a radio frequency (RF) conversion circuit 4, and a transceiving antenna 5. The wireless transceiver 1 according to the present embodiment includes not only the configurations listed herein but also various configurations used in an existing ODFM wireless transmitter, but descriptions of these configurations will be omitted herein.

The control unit 2 includes a CPU 21 which controls the overall control unit 2, a ROM 22 which stores a control program or the like to be executed on the CPU 21, and a RAM 23 which temporarily stores a variety of data.

Figure 2:
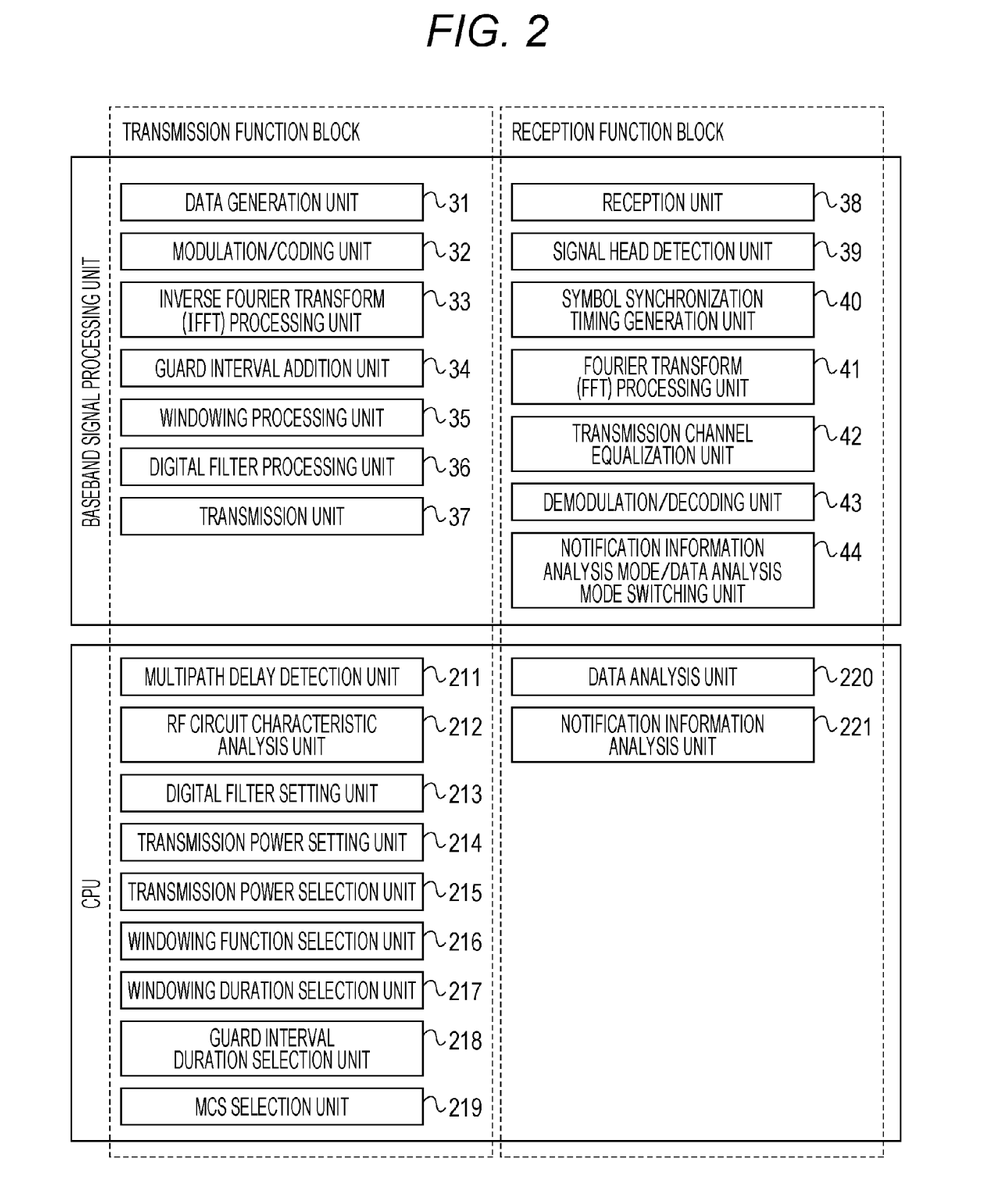
FIG. 2 is a functional block diagram illustrating functional configurations of a wireless transmitter and a wireless receiver.

FIG. 2 is a functional block diagram illustrating a transmission function configuration and a reception function configuration of the wireless transceiver. The control unit 2 functions as a multipath delay detection unit 211, an RF circuit characteristic analysis unit 212, a digital filter setting unit 213, a transmission power setting unit 214, a transmission power selection unit 215, a windowing function selection unit 216, a windowing duration selection unit 217, a guard interval duration selection unit 218, and an MCS selection unit 219, so that the CPU 21 loads the control program stored in the ROM 22 into the RAM 23 and executes a wireless transmission procedure as described hereafter, and functions as a data analysis unit 220 and a notification information analysis unit 221 so that the CPU 21 executes a wireless reception procedure as described hereafter.

In addition, the baseband signal processing unit 3 includes a data generation unit 31, a modulation/coding unit 32, an inverse Fourier transform (IFFT) processing unit 33, a guard interval addition unit 34, a windowing processing unit 35, a digital filter processing unit 36, and a transmission unit 37, as baseband signal processing in the wireless transmission procedure as described hereafter, and includes a reception unit 38, a signal head detection unit 39, a symbol synchronization timing generation unit 40, a Fourier transform (FFT) processing unit 41, a transmission channel equalization unit 42, a demodulation/decoding unit 43, and a notification information analysis mode/data analysis mode switching unit 44, as baseband signal processing in the wireless reception procedure as described hereafter.

Figure 3:
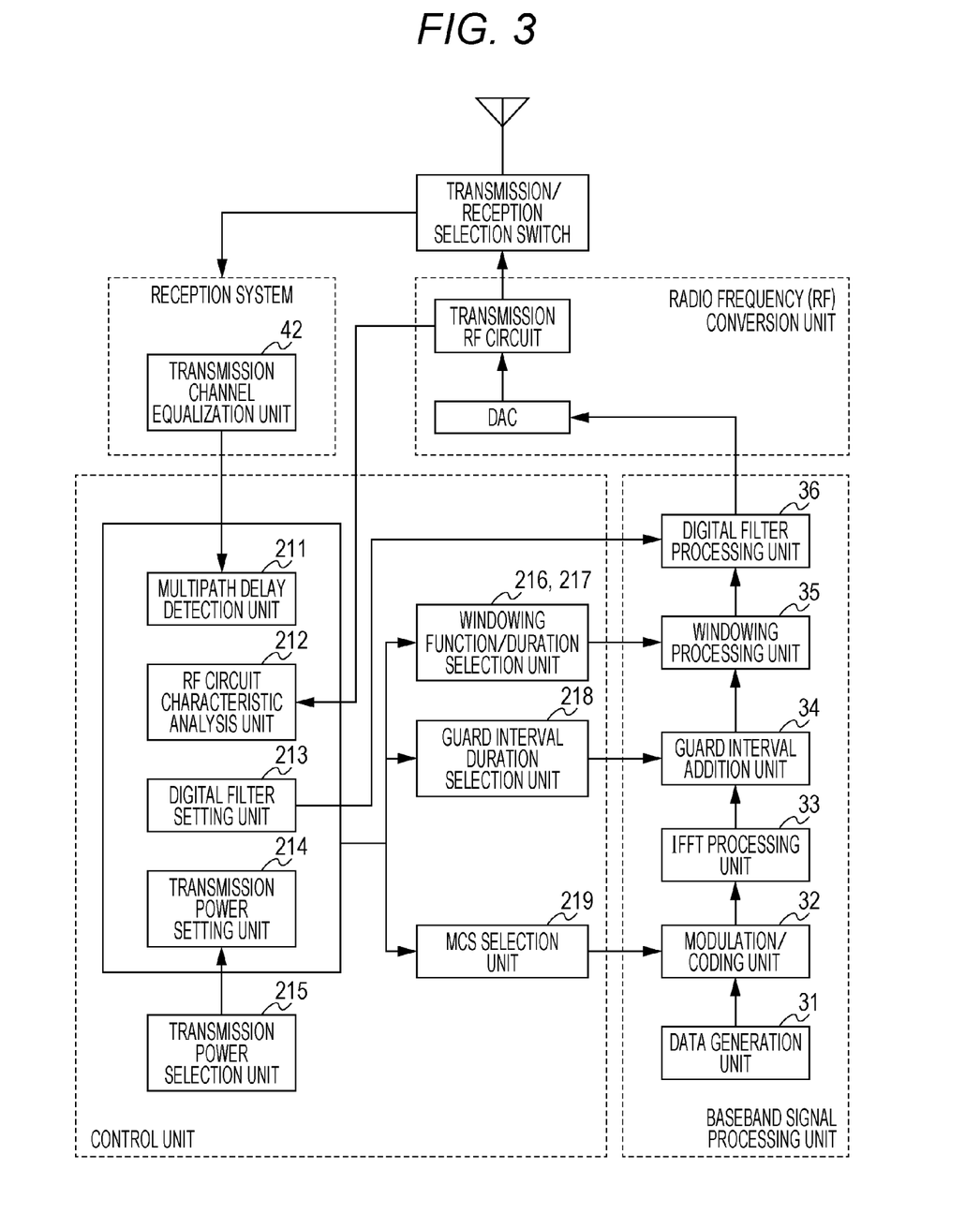
FIG. 3 is a diagram illustrating a function block relationship and a processing flow of a wireless transmitter.

FIG. 3 is a diagram illustrating a transmission function block relationship and a processing flow of the wireless transceiver illustrated in FIG. 2.

The data generation unit 31 generates transmission data.

The modulation/coding unit 32 modulates and codes the transmission data based on a modulation and coding scheme (MCS) selected by the MCS selection unit 219 as described hereafter, and generates subcarrier data.

The inverse Fourier transform (IFFT) processing unit 33 performs inverse Fourier transform on the subcarrier data, which is generated by the data generation unit 31 and the modulation/coding unit 32, and performs orthogonal frequency division multiplexing.

The guard interval addition unit 34 adds a guard interval (GI) to an output signal of the inverse Fourier transform (IFFT) processing unit 33 and generates an OFDM data symbol.

The windowing processing unit 35 performs windowing processing on the OFDM data symbol.

The digital filter processing unit 36 performs transmission digital filter processing, such as a band limiting filter, on the OFDM data symbol.

The transmission unit 37 transmits the OFDM data symbol, on which a variety of processing has been performed, to the radio frequency (RF) conversion circuit 4 so as to transmit the OFDM data symbol via the transceiving antenna 5.

The multipath delay detection unit 211 detects the degree of multipath delay in a communication environment.

The RF circuit characteristic analysis unit 212 analyzes spectrum characteristics in a use frequency band, which are included in the RF circuit characteristics of the radio frequency conversion circuit 4 of the wireless transmitter 1. The RF circuit characteristics of the radio frequency conversion circuit 4 can be obtained by previous measurement or the like.

The digital filter setting unit 213 sets parameters of a transmission digital filter of the wireless transmitter 1.

The transmission power setting unit 214 sets desired transmission power of the wireless transmitter 1.

The transmission power selection unit 215 selects signal transmission power of the OFDM symbol from a table stored in the ROM 22, based on the information fed back from the receiver or a variety of information or the like detected by the multipath delay detection unit 211, the RF circuit characteristic analysis unit 212, the digital filter setting unit 213, and the transmission power setting unit 214.

The windowing function selection unit 216 and the windowing duration selection unit 217 select a windowing function and a windowing duration, which are used in windowing to be performed on the OFDM symbol, from a table stored in the ROM 22, based on the information fed back from the receiver or a variety of information or the like detected by the multipath delay detection unit 211, the RF circuit characteristic analysis unit 212, the digital filter setting unit 213, and the transmission power setting unit 214.

The guard interval duration selection unit 218 selects a guard interval duration to be added to the OFDM data symbol from a table stored in the ROM 22, based on the information fed back from the receiver or a variety of information or the like detected by the multipath delay detection unit 211, the RF circuit characteristic analysis unit 212, the digital filter setting unit 213, and the transmission power setting unit 214.

The MCS selection unit 219 selects an MCS at the time of generating the subcarrier data from a table stored in the ROM 22, based on the information fed back from the receiver or a variety of information or the like detected by the multipath delay detection unit 211, the RF circuit characteristic analysis unit 212, the digital filter setting unit 213, and the transmission power setting unit 214.

Figure 4:
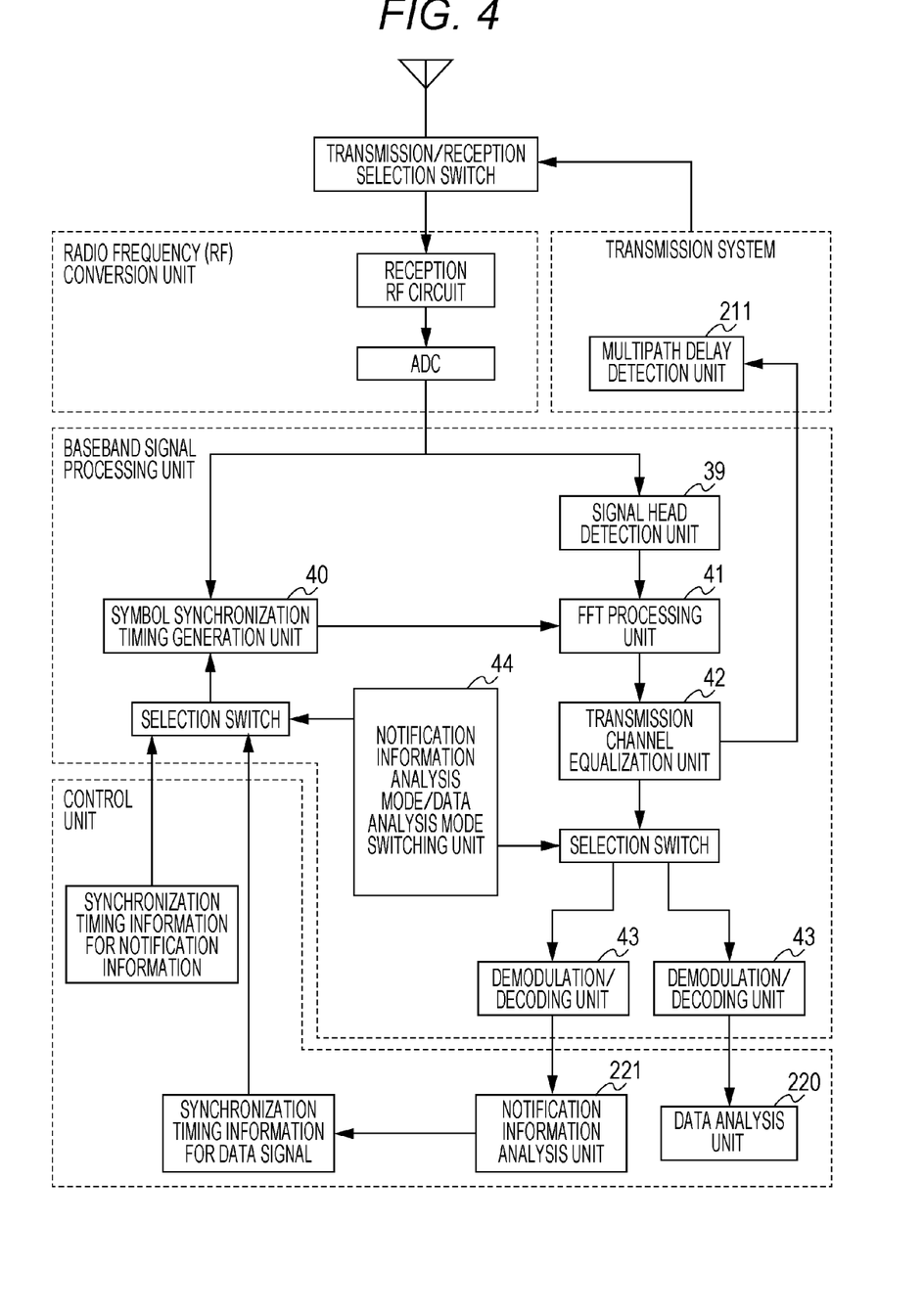
FIG. 4 is a diagram illustrating a function block relationship and a processing flow of a wireless receiver.

FIG. 4 is a diagram illustrating a reception function block relationship and a processing flow of the wireless transceiver illustrated in FIG. 2.

The reception unit 38 receives a reception signal from the radio frequency (RF) conversion circuit 4 via the transceiving antenna 5.

The signal head detection unit 39 detects a head part of the reception signal which is necessary for generating the symbol synchronization timing.

The symbol synchronization timing generation unit 40 generates the symbol synchronization timing, which is necessary for the Fourier transform (FFT) processing unit 41 as described hereafter to perform the Fourier transform (FFT), by using the head part detection information of the reception signal which is detected by the signal head detection unit 39, the synchronization timing information for the notification information which is stored in the ROM 22, or the synchronization timing information for the data signal which is analyzed by the notification information analysis unit 221 as described hereafter.

The Fourier transform processing unit 41 converts an OFDM time signal, on which the orthogonal frequency division multiplexing has been performed, into a frequency signal for each subcarrier by performing the Fourier transform processing on the reception signal by using the symbol synchronization timing generated by the symbol synchronization timing generation unit 40.

The transmission channel equalization unit 42 estimates a transmission channel with respect to a frequency signal for each subcarrier, which is Fourier-transformed by the Fourier transform processing unit 41, and further equalizes the influence of the transmission channel.

The demodulation/decoding unit 43 performs demodulation and decoding on the frequency signal for each subcarrier, whose transmission channel has been equalized.

The notification information analysis mode/data analysis mode switching unit 44 switches processing of the notification information analysis mode and processing of the data analysis mode, as processing to be performed on the reception signal.

The data analysis unit 220 analyzes data included in the demodulated and decoded data signal.

The notification information analysis unit 221 analyzes the windowing function, the windowing duration, and the guard interval duration, which are included in the demodulated and decoded notification information, or the optimal symbol synchronization timing information, and if necessary, the broadcast control information such as the MCS.

Next, the windowing processing by the aforementioned windowing processing unit 35 will be described in detail.

Figure 5:
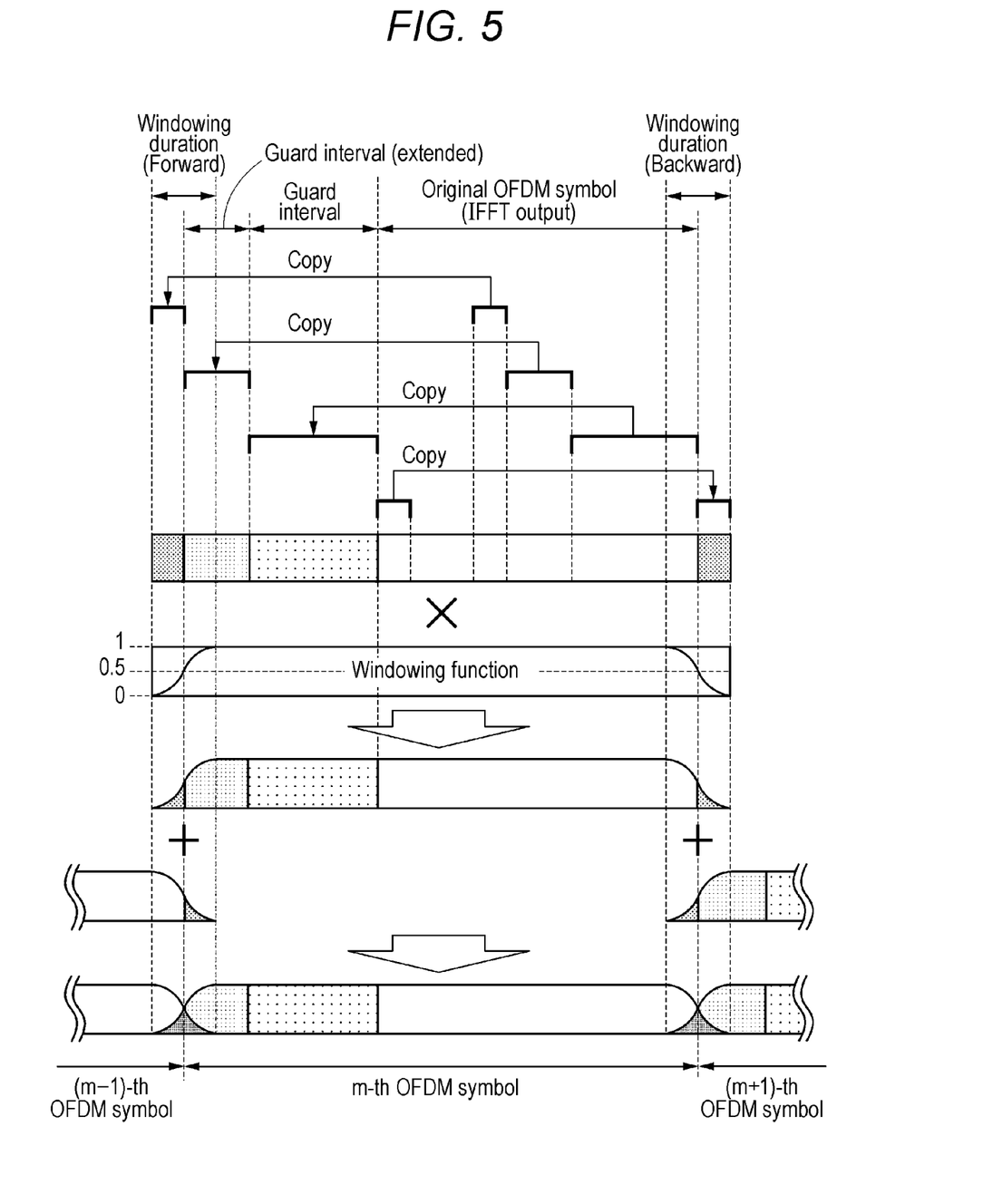
FIG. 5 is a diagram illustrating a principle of windowing.

FIG. 5 is a diagram illustrating a principle of the windowing processing. The windowing is waveform shaping processing using a windowing function (function whose amplitude weighting factor gradually becomes 1 to 0 (0 to 1)) such as fade-out or fade-in from the boundary of the OFDM symbol. As a specific example, various windowing functions such as a raised cosine window, a root raised cosine window, a trapezoidal window, and a hamming window, can be applied. In the example illustrated in FIG. 5, the raised cosine window is used. In addition, a duration corresponding to a length of the OFDM data symbol, to which these windowing functions are applied, is referred to as a windowing duration.

By performing the windowing on a discontinuous point between symbols, a joint between adjacent symbols can be made close to a smooth continuous point and out-of-band radiation of the transmission signal can be alleviated.

Before the windowing processing is performed, the guard interval addition unit 34 copies the head part of the original OFDM data symbol (output signal of the inverse Fourier transform processing unit 33) and adds the copied portion to the symbol head. The section that is added to the symbol head is a guard interval. Generally, the guard interval duration is determined by the degree of multipath delay of the communication environment. Note that since power of the symbol end is reduced by performing the windowing, the guard interval duration may be further extended.

The guard interval is extended forward and backward so that the adjacent symbols superimpose each other according to the windowing duration. After that, the out-of-band radiation can be suppressed by performing the windowing and transmitting the adjacent symbols while partially superimposing the adjacent symbols.

Figure 6:
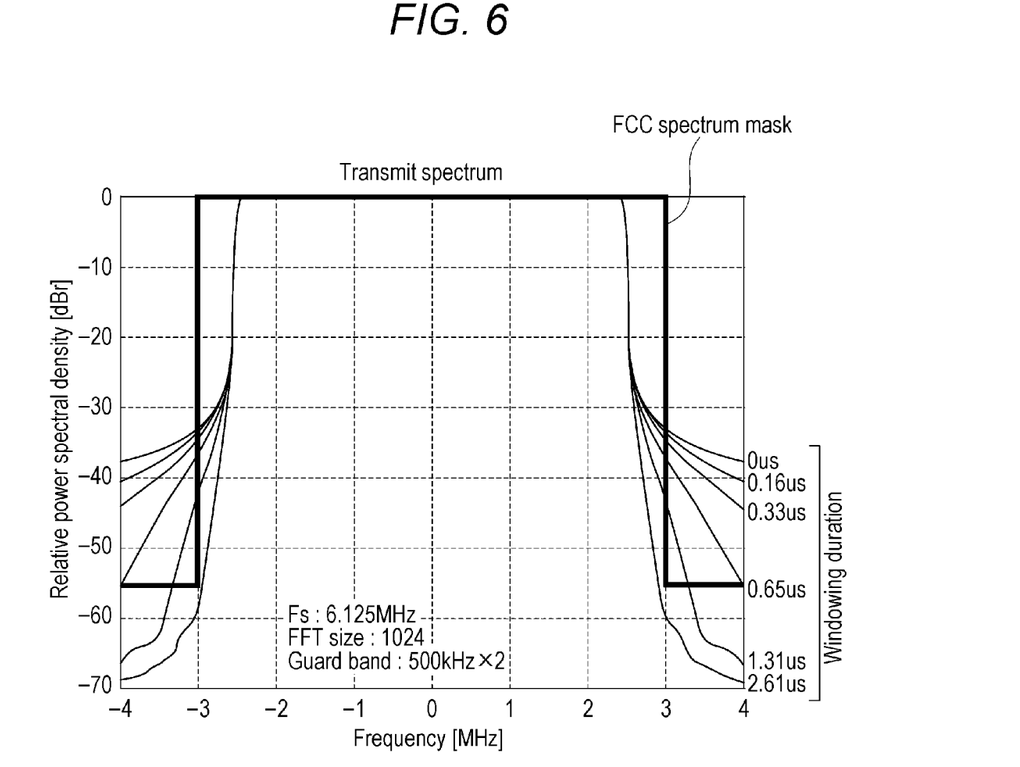
FIG. 6 is a diagram illustrating an out-of-band radiation suppression result in the case of changing a windowing duration.

FIG. 6 is a diagram illustrating the out-of-band radiation suppression result in the case of changing the windowing duration. In the example illustrated in FIG. 6, the out-of-band radiation gets reduced as the windowing duration becomes longer. In the case of 2.61 us, the portion of the out-of-band radiation is output below the spectrum mask of the FCC. Even when the out-of-band radiation occurs, the spectrum mask regulation can be satisfied.

As described below, in the present invention, a plurality of parameters including the windowing duration is variable. Therefore, the degree of reduction of the out-of-band radiation can be adjusted while observing the balance with other factors that influence the out-of-band radiation.

For example, the out-of-band radiation can be more effectively suppressed by increasing the windowing duration. In addition, by suppressing the out-of-band radiation, the signal transmission power can be increased while complying with the spectrum mask regulation, thereby widening the coverage area.

However, when the windowing duration is increased, the portion influenced by the windowing processing is increased as much. Hence, an effective guard interval duration is reduced. In securing the effective guard interval duration, a necessity to secure a longer guard interval duration arises. As a result, the throughput is reduced.

Therefore, in the wireless transmitter according to the present invention, by inputting arguments such as the transmission power of the wireless transmitter, the degree of multipath delay, the RF circuit characteristic, and the like, it is possible to select the optimal windowing function, windowing duration, and guard interval duration, based on these values, so as to perform the optimal communication while satisfying the transmission spectrum mask regulation. In this way, the out-of-band radiation can be effectively suppressed while suppressing the reduction of the transmission power or the reduction of the coverage area, and the reduction of the throughput. Hereinafter, the selection procedure will be described in detail.

Figure 7:
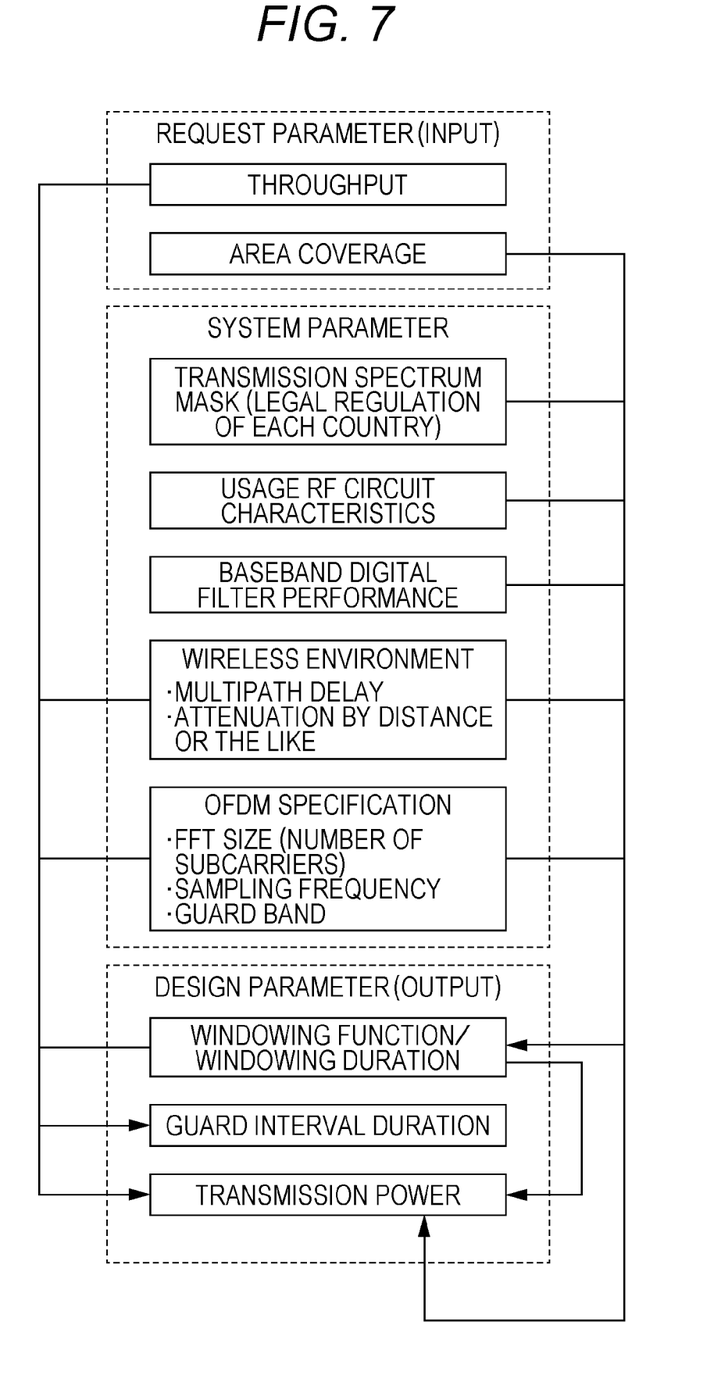
FIG. 7 is a diagram illustrating an example of a relationship of a request parameter, a system parameter, and a design parameter.

FIG. 7 is a diagram illustrating an example of a relationship of a request parameter, a system parameter, and a design parameter. The request parameter is a parameter that must be optimized so as to satisfy the transmission spectrum mask regulation in the individual communication environments. The system parameter is a generic term for various parameters determined by the wireless transceiver or the communication environment that operates the wireless transceiver, and is a fixed value when the transmitter and the receiver are left at a predetermined position and environment. The design parameter is a variable parameter that must be designed so as to realize the request parameter.

In the example of FIG. 7, examples of the request parameter include the throughput and the area coverage. In addition, examples of the system parameter include wireless environments, such as the transmission spectrum mask by the legal regulation of each country, the RF circuit characteristics of the wireless transmitter, digital filter characteristics of the baseband, and the degree of signal attenuation according to the multipath delay or distance, and OFDM specifications such as the FFT size (number of subcarriers), the sampling frequency, and the guard band. In addition, examples of the design parameter include the windowing function, the windowing duration, the guard interval duration, and the transmission power.

In the example of FIG. 7, in order to obtain the request parameter, that is, desired throughput or area coverage (in this case, adoptable maximum value), the windowing function, the windowing duration, the guard interval duration, and the transmission power, which are the design parameter, are obtained by the control unit 2, based on the value of each system parameter and the table stored in the ROM 22. The parameters, which are included in the request parameter, the system parameter, and the design parameter, are appropriately changed according to the situation.

The processing performed in FIG. 7 will be described. First, the control unit 2 loads, from the ROM 22, each parameter such as the wireless environments, such as the transmission spectrum mask by the legal regulation of each country, the RF circuit characteristics of the wireless transmitter, the digital filter characteristics of the baseband, and the degree of signal attenuation according to the multipath delay or distance, the FFT size (number of subcarriers), the sampling frequency, and the guard band, as the system parameter.

Then, the notification information is broadcast from the wireless transmitter 1.

Then, when a user (receiver) within the coverage area receives the broadcast notification information, a communication request is transmitted from the corresponding user to the wireless transmitter 1. At this time, the information regarding the wireless environment such as the degree of signal attenuation according to the multipath delay or distance is transmitted to the wireless transmitter 1 together with the communication request, the feedback of aforementioned information is performed.

Then, the wireless transmitter 1, which receives the feedback information from the user, selects the optimal windowing function, windowing duration, guard interval duration, and transmission power so as to obtain the desired throughput and area coverage, with reference to the table stored in the ROM 22, based on the corresponding feedback information.

Specifically, based on the feedback information and the table, the transmission power selection unit 215 of the control unit 2 selects the transmission power, the windowing function selection unit 216 and the windowing duration selection unit 217 select the windowing function and the windowing duration, the guard interval duration selection unit 218 selects the guard interval duration, and the MCS selection unit 219 selects the MCS.

In the above-described embodiment, the windowing function, the windowing duration, the guard interval duration, and the transmission power may be separately set with respect to each OFDM data symbol included in a preamble section of the transmission data and a data section subsequent to the preamble section.

In addition, the wireless transmitter 1 may transmit the data symbol to the receiver in combination with a control signal. Then, the receiver may set the symbol synchronization timing by using control information included in the control signal transmitted from the wireless transmitter, the information on the windowing function, the windowing duration, the guard interval duration and the optimal symbol synchronization timing.

In addition, the wireless transmitter 1 may include a notification unit that notifies the information of the windowing function, the windowing duration, the guard interval duration, and the optimal symbol synchronization timing of the OFDM symbol included in the preamble section and the data section of the transmission data, as a fixed windowing function, a fixed windowing duration, and a fixed guard interval duration, together with the control information.

In the above-described wireless transmitter according to the embodiment, even when the wireless communication is performed in the white space to which the strict transmission spectrum mask regulation is applied, it is possible to dynamically select the optimal windowing function, windowing duration, guard interval duration, and transmission power, based on each parameter associated with the performance of one's own apparatus or the communication environment and the prestored table. Therefore, it is possible to effectively suppress the out-of-band radiation while securing a sufficient coverage and throughput, without unnecessarily reducing the transmission power for satisfying the transmission spectrum mask regulation.

REFERENCE SIGNS LIST 1 wireless transmitter
2 control unit
3 baseband signal processing unit
4 radio frequency (RF) conversion unit
5 transceiving antenna
21 CPU
22 ROM
23 RAM
31 data generation unit
32 modulation/coding unit
33 inverse Fourier transform (IFFT) processing unit
34 guard interval addition unit
35 windowing processing unit
36 digital filter processing unit
37 transmission unit
38 reception unit
39 signal head detection unit
40 symbol synchronization timing generation unit
41 Fourier transform (FFT) processing unit
42 transmission channel equalization unit
43 demodulation/decoding unit
44 notification information analysis mode/data analysis mode switching unit
211 multipath delay detection unit
212 RF circuit characteristic analysis unit
213 digital filter setting unit
214 transmission power setting unit 215 transmission power selection unit
216 windowing function selection unit
217 windowing duration selection unit
218 guard interval duration selection unit
219 MCS selection unit
220 data analysis unit
221 notification information analysis unit
FIG. 1
2 CONTROL UNIT
3 BASEBAND SIGNAL PROCESSING UNIT
4 RADIO FREQUENCY (RF) CONVERSION UNIT
FIG. 2
TRANSMISSION FUNCTION BLOCK
RECEPTION FUNCTION BLOCK
BASEBAND SIGNAL PROCESSING UNIT
31 DATA GENERATION UNIT
32 MODULATION/CODING UNIT
33 INVERSE FOURIER TRANSFORM (IFFT) PROCESSING UNIT
34 GUARD INTERVAL ADDITION UNIT
35 WINDOWING PROCESSING UNIT
36 DIGITAL FILTER PROCESSING UNIT
37 TRANSMISSION UNIT
38 RECEPTION UNIT
39 SIGNAL HEAD DETECTION UNIT
40 SYMBOL SYNCHRONIZATION TIMING GENERATION UNIT
41 FOURIER TRANSFORM (FFT) PROCESSING UNIT
42 TRANSMISSION CHANNEL EQUALIZATION UNIT
43 DEMODULATION/DECODING UNIT
44 NOTIFICATION INFORMATION ANALYSIS MODE/ DATA ANALYSIS MODE SWITCHING UNIT
211 MULTIPATH DELAY DETECTION UNIT
212 RF CIRCUIT CHARACTERISTIC ANALYSIS UNIT
213 DIGITAL FILTER SETTING UNIT
214 TRANSMISSION POWER SETTING UNIT
215 TRANSMISSION POWER SELECTION UNIT
216 WINDOWING FUNCTION SELECTION UNIT
217 WINDOWING DURATION SELECTION UNIT
218 GUARD INTERVAL DURATION SELECTION UNIT
219 MCS SELECTION UNIT
220 DATA ANALYSIS UNIT
221 NOTIFICATION INFORMATION ANALYSIS UNIT
FIG. 3
TRANSMISSION/RECEPTION SELECTION SWITCH
RECEPTION SYSTEM
TRANSMISSION RF CIRCUIT
RADIO FREQUENCY (RF) CONVERSION UNIT
42 TRANSMISSION CHANNEL EQUALIZATION UNIT
211 MULTIPATH DELAY DETECTION UNIT
212 RF CIRCUIT CHARACTERISTIC ANALYSIS UNIT
213 DIGITAL FILTER SETTING UNIT
214 TRANSMISSION POWER SETTING UNIT
215 TRANSMISSION POWER SELECTION UNIT
216, 217 WINDOWING FUNCTION/DURATION SELECTION UNIT
218 GUARD INTERVAL DURATION SELECTION UNIT
219 MCS SELECTION UNIT
31 DATA GENERATION UNIT
32 MODULATION/CODING UNIT
33 IFFT PROCESSING UNIT
34 GUARD INTERVAL ADDITION UNIT
35 WINDOWING PROCESSING UNIT
36 DIGITAL FILTER PROCESSING UNIT
CONTROL UNIT
BASEBAND SIGNAL PROCESSING UNIT
FIG. 4
TRANSMISSION/RECEPTION SELECTION SWITCH
RADIO FREQUENCY (RF) CONVERSION UNIT
RECEPTION RF CIRCUIT
TRANSMISSION SYSTEM
211 MULTIPATH DELAY DETECTION UNIT
BASEBAND SIGNAL PROCESSING UNIT
39 SIGNAL HEAD DETECTION UNIT
40 SYMBOL SYNCHRONIZATION TIMING GENERATION UNIT
41 FFT PROCESSING UNIT
42 TRANSMISSION CHANNEL EQUALIZATION UNIT
SELECTION SWITCH
43 DEMODULATION/DECODING UNIT
43 DEMODULATION/DECODING UNIT
44 NOTIFICATION INFORMATION ANALYSIS MODE/ DATA ANALYSIS MODE SWITCHING UNIT
SELECTION SWITCH
CONTROL UNIT
SYNCHRONIZATION TIMING INFORMATION FOR NOTIFICATION INFORMATION
SYNCHRONIZATION TIMING INFORMATION FOR DATA SIGNAL
220 DATA ANALYSIS UNIT
221 NOTIFICATION INFORMATION ANALYSIS UNIT
FIG. 7
REQUEST PARAMETER (INPUT)
THROUGHPUT
AREA COVERAGE
SYSTEM PARAMETER
TRANSMISSION SPECTRUM MASK
(LEGAL REGULATION OF EACH COUNTRY)
USAGE RF CIRCUIT CHARACTERISTICS
BASEBAND DIGITAL FILTER PERFORMANCE
WIRELESS ENVIRONMENT
MULTIPATH DELAY
ATTENUATION BY DISTANCE OR THE LIKE
OFDM SPECIFICATION
FFT SIZE (NUMBER OF SUBCARRIERS)
SAMPLING FREQUENCY
GUARD BAND
DESIGN PARAMETER (OUTPUT)
WINDOWING FUNCTION/WINDOWING DURATION
GUARD INTERVAL DURATION
TRANSMISSION POWER

The invention claimed is:
1. A wireless transmitter for performing data transmission by using OFDM in an operating frequency band in which a transmission spectrum mask regulation is strict, the wireless transmitter comprising:
an RF circuit characteristic analysis unit which analyzes spectrum characteristics in a use frequency band that are included in RF circuit characteristics of a radio frequency conversion unit of the wireless transmitter;
a multipath delay detection unit which detects a degree of signal attenuation according to a multipath delay in a communication environment of the wireless transmitter, and which detects a degree of signal attenuation according to a distance in the communication environment of the wireless transmitter;
a transmission power setting unit which sets a desired transmission power of the wireless transmitter;

a digital filter setting unit which sets characteristics of a digital transmission filter of a baseband of the wireless transmitter;

a windowing function and windowing duration selection unit which selects a windowing function and a windowing duration used in windowing to be executed in OFDM symbols based on each system parameter including: (i) the RF circuit characteristics of the wireless transmitter analyzed by the RF circuit characteristic analysis unit, (ii) the degree of signal attenuation according to the multipath delay and the degree of signal attenuation according to the distance detected by the multipath delay detection unit, (iii) the desired transmission power set by the transmission power setting unit, and (iv) the characteristics of the digital transmission filter of the baseband set by the digital filter setting unit;

a guard interval duration selection unit which selects a guard interval duration to be added to the OFDM symbols; and a transmission power selection unit which selects a transmission power of the OFDM symbols.

2. The wireless transmitter according to claim 1, wherein the windowing function, the windowing duration, the guard interval duration, and the transmission power of the OFDM symbols are separately settable with respect to each of the OFDM symbols included in a preamble section of transmission data and a data section subsequent to the preamble section.

3. The wireless transmitter according to claim 2, further comprising a notification unit which notifies information of the windowing function, the windowing duration and the guard interval duration, or an optimal symbol synchronization timing of an OFDM symbol included in the preamble section and the data section of the transmission data, as a fixed windowing function, a fixed windowing duration, and a fixed guard interval duration.

4. A wireless receiver which sets a symbol synchronization timing of a received signal by using control information and information of the windowing function, the windowing duration, and the guard interval duration, or an optimal symbol synchronization timing, which are included in information notified from the wireless transmitter according to claim 1.

5. A wireless transmission method for performing data transmission by using OFDM in an operating frequency band in which a transmission spectrum mask regulation is strict, the wireless transmission method comprising:

analyzing spectrum characteristics in a use frequency band which are included in RF circuit characteristics of a radio frequency conversion unit of the wireless transmitter;

detecting a degree of signal attenuation according to a multipath delay in a communication environment of the wireless transmitter, and detecting a degree of signal attenuation according to a distance in the communication environment of the wireless transmitter;

setting a desired transmission power of the wireless transmitter;

characteristics of a digital transmission filter of a baseband of the wireless transmitter;

selecting a windowing function and a windowing duration used in windowing to be executed in OFDM symbols based on each system parameter including: (i) the analyzed RF circuit characteristics of the wireless transmitter, (ii) the detected degree of signal attenuation according to the multipath delay and the detected the degree of signal attenuation according to the distance, (iii) the set desired transmission power, and (iv) the set characteristics of the digital transmission filter of the baseband, selecting a guard interval duration to be added to the OFDM symbols; and selecting a transmission power of the OFDM symbols.

6. The wireless transmission method according to claim 5, wherein the windowing function, the windowing duration, the guard interval duration, and the transmission power of the OFDM symbols are separately settable with respect to each of the OFDM symbols included in a preamble section of transmission data and a data section subsequent to the preamble section.

7. The wireless transmission method according to claim 6, further comprising notifying information of the windowing function, the windowing duration and the guard interval duration, or an optimal symbol synchronization timing of an OFDM symbol included in the preamble section and the data section of the transmission data, as a fixed windowing function, a fixed windowing duration, and a fixed guard interval duration.

8. A wireless reception method comprising setting a symbol synchronization timing of a received signal by using control information and information of the windowing function, the windowing duration, and the guard interval duration, or an optimal symbol synchronization timing, which are included in information notified by using the wireless transmission method according to claim 5.

9. A wireless receiver which sets a symbol synchronization timing of a received signal by using control information and information of the windowing function, the windowing duration, and the guard interval duration, or an optimal symbol synchronization timing, which are included in information notified from the wireless transmitter according to claim 2.

10. A wireless receiver which sets a symbol synchronization timing of a received signal by using control information and the information of the windowing function, the windowing duration, and the guard interval duration, or the optimal symbol synchronization timing, which are included in the information notified from the wireless transmitter according to claim 3.

11. A wireless reception method comprising setting a symbol synchronization timing of a received signal by using control information and information of the windowing function, the windowing duration, and the guard interval duration, or an optimal symbol synchronization timing, which are included in information notified by using the wireless transmission method according to claim 6.

12. A wireless reception method comprising setting a symbol synchronization timing of a received signal by using control information and the information of the windowing function, the windowing duration, and the guard interval duration, or the optimal symbol synchronization timing, which are included in the information notified by using the wireless transmission method according to claim 7.

* * * * *